United States Patent
Kudrin et al.

(10) Patent No.: US 10,776,236 B1
(45) Date of Patent: Sep. 15, 2020

(54) TRANSFERRABLE CONTAINERIZED APPLICATIONS FOR REMOTE-ACCESS CLIENT-SERVER ENVIRONMENTS

(71) Applicant: Parallels International GmbH, Schaffhausen (CH)

(72) Inventors: Maxim Kudrin, Moscow (RU); Liubov Kulakova, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 42 days.

(21) Appl. No.: 15/954,550

(22) Filed: Apr. 16, 2018

(51) Int. Cl.
*G06F 15/16* (2006.01)
*G06F 11/30* (2006.01)
*H04L 29/08* (2006.01)
*G06F 11/34* (2006.01)
(Continued)

(52) U.S. Cl.
CPC ........ *G06F 11/3006* (2013.01); *G06F 9/4806* (2013.01); *G06F 11/3409* (2013.01); *H04L 67/025* (2013.01); *H04L 67/101* (2013.01); *H04L 67/141* (2013.01); *H04L 67/42* (2013.01)

(58) Field of Classification Search
CPC ............... G06F 11/3006; G06F 9/4806; G06F 11/3452; G06F 11/3409; G06F 11/3433; G06F 11/302; G06F 11/3024; G06F 11/3428; G06F 11/3457; G06F 11/3466; G06F 11/3476; G06F 9/45558; G06F 9/50; G06F 16/24578; G06F 2201/81; G06F 17/10; H04L 67/025; H04L 67/10; H04L 67/125; H04L 67/18; H04L 67/1008; H04L 67/101; H04L 67/28; H04L 67/32; H04L 67/25; H04L 67/141; H04L 43/16; H04L 43/08; H04L 43/0876; H04L 41/147; H04L 41/0041; H04L 45/70; H04L 63/1425; H04L 1/0041; H04L 1/0045
See application file for complete search history.

(56) References Cited

U.S. PATENT DOCUMENTS

| | | | |
|---|---|---|---|
| 7,660,887 B2 * | 2/2010 | Reedy | G06F 9/542 709/223 |
| 2014/0040883 A1 * | 2/2014 | Tompkins | G06F 9/5072 718/1 |

OTHER PUBLICATIONS

Vinod Namboodiri, "To Cloud or Not to Cloud: A Mobile Device Perspective on Energy Consumption of Applications", 2012, IEEE 978-1-4673-1239-4/12, pp. 4-8 (Year: 2012).*

* cited by examiner

*Primary Examiner* — Chirag R Patel
*Assistant Examiner* — Rachel J Hackenberg
(74) *Attorney, Agent, or Firm* — Lowenstein Sandler LLP

(57) ABSTRACT

The subject matter of this specification can be implemented in, among other things, a method that includes establishing, by a processing device, a remote access session between a local computing device and a remote computing device connected by a network, receiving, by the remote computing device a request to execute an application, and determining, by a processing device, a remote efficiency value indicating estimated efficiency of executing the application on the remote computing device and a local efficiency value indicating estimated efficiency of executing the application on the local computing device. The method further includes comparing the remote efficiency value with the local effi- (Continued)

ciency value to determine whether to execute the application on the remote computing device or on the local computing device.

20 Claims, 7 Drawing Sheets

(51) Int. Cl.
*G06F 9/48* (2006.01)
*H04L 29/06* (2006.01)

TRANSFERRABLE CONTAINERIZED APPLICATIONS FOR REMOTE-ACCESS CLIENT-SERVER ENVIRONMENTS

TECHNICAL FIELD

This instant specification generally relates to running applications from a client device using a virtual execution environment hosted by a remote server. More specifically, the instant specification relates to using transferrable containerized application in remote-access client-server environments.

BACKGROUND

In a network environment it is often advantageous for a user of a computing device to execute applications on a remote server rather than on the local device. Multiple client devices (clients) can have access to the remote server and applications installed on that server. This eliminates the need to install and upkeep separate applications on client devices, decreases administration demands and costs, and promotes uniformity of user experiences and interchangeability of client devices. Such server-based computing allows utilizing remote server's computing power and memory capabilities, which often significantly exceed resources available on client terminal devices. Often, a client device is a "lean" (or "thin") machine which itself performs little computing, or storage of data, with only keyboard, mouse, and graphical interface data exchanges between the lean client and the remote server device with the bulk of computing, data processing, and data storage taking place on the remote server. The applications executed on the remote server are being controlled by the client device via, for example, a remote desktop virtualization session.

In a typical virtualization session, after the client device gains access to the host server, a guest operating system is launched on the host server. Separate guest operating systems are provided for separate client devices. Guest operating systems are managed by a virtual machine monitor, also referred to as a hypervisor. The hypervisor is installed on a host operating system of the remote server. Each user can access applications that are authorized (published) for that particular user by the host server. The applications and the data generated by the applications generally remain on the remote host server. The local client device communicates with the remote sever using a remote display protocol. In other implementations of a remote client-server access, it could be more efficient (e.g., from a software licensing standpoint) to make multiple client devices share the same guest operating system on the host server but execute applications within separate non-overlapping "containers" assigned to various clients. Such containerization approach allows different client devices share operating system's relevant binaries, libraries, and drivers, and only assign to each container binaries and libraries relevant for a particular application. Compared with the need to initialize and maintain separate guest operating systems, a containerization engine installed atop the host operating system requires less memory and represents a smaller and faster way to run applications remotely. Accordingly, containerization allows the server to potentially host far more application containers than virtual machines.

DETAILED DESCRIPTION

Figure 1:
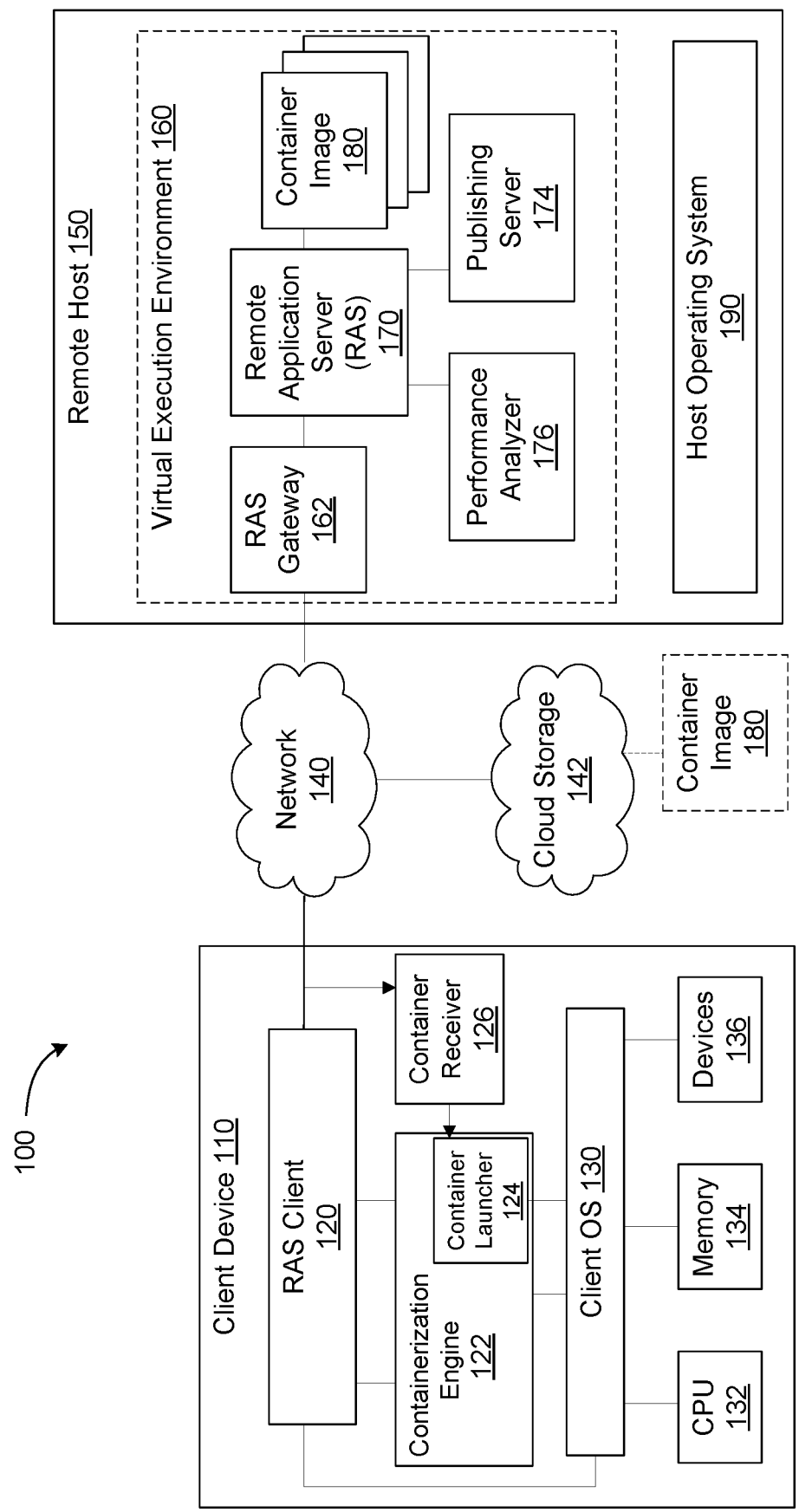
FIG. 1 depicts a high-level schematic diagram that shows an example of a client-server virtual execution environment that supports containerized applications transferable between the client device and the remote server host.

As discussed above, in a network environment it is often advantageous for a user of a computing device to execute applications on a remote server rather than on the local device. However, utilization of remote servers can present a number of issues and challenges. For example, if the server is overloaded with applications run and operated by a large number of client devices, the efficiency of remote operations might not justify running an additional application on the remote server. If the quality of the server-client network connection is low, or the network connection is having a temporary surge in traffic, a user of the client device might not be able to take full advantage of the computing facilities of the server, held back by the "bottleneck" in the network connection. Also, there might be inconsistencies between graphic interface images delivered from the remote server as compared to the images the user is accustomed to seeing on the client machine. Aspects of the present disclosure address the above and other deficiencies by having a remote application server component on the remote server host to decide whether to execute an application on the client device or on the remote server host. In particular, a decision may be made that the intrinsic limitations of the remote server-client environment (current utilization of server's resources, parameters of the network connection, the computing and memory capabilities of the client device, compatibility of graphic interfaces, etc.), as well as the extrinsic considerations (security, privacy, etc.), may make it more efficient, optimal, or desirable to run a particular application on the client device rather than on the remote host server. Such a decision can be made when a new client connects to the remote host, when the already connected client launches a new application on the remote server, or even when an application already launched on the server experiences a slowdown due to the remote server's overload or a poor network connection. This can happen, for example, when the quality of the network connection deteriorates and causes an adverse effect on the performance of an application being presently executed.

When the remote host makes a determination to run an application on the client device, the remote server host may access the file system and configuration of the application, called "image." An image may be a read-only static template with instructions for creating a "container." A container is a running instance of the application including the application, its dependencies, and associated data. Containers may be used to run actual instances of the application securely as isolated—from other containers—processes even though they may share the same OS kernel. A container image may be provided to the client device. The container image may then be unpacked on the client device and used to instantiate a container with a running instance of the application. The container may be executed using the client device's infrastructure, such as processing units, memory storage devices, etc., and software components, installed on the client devices, including, in some embodiments, software that facilitates opening and operating the received container.

The client device may be a personal computer, a laptop, a desktop, a tablet, a mobile device, or another server. The client device can be an endpoint or a terminal device. The remote server host may be a single computing device, or it may comprise multiple devices, or be a part of a cloud computing group. The client device may be connected to the remote server via a local area network (LAN), Internet, or a telecommunications network. The client device may be connected to the remote server via multiple networks. For example a client mobile device can be connected to an intermediary (a server, a desktop computer, etc.) via a telecommunications network whereas the intermediary may be connected to the remote server via LAN or Internet.

A client-server virtual execution environment can have a variety of possible implementations. In one example, a virtual execution environment may be implemented by a remote personal computer (PC) agent running on a personal computer system. In another example, client-server computing model may utilize a virtual desktop infrastructure (VDI). Available VDI platforms may include Citrix®, VMWare®, Dell-Quest, LISTEQ, Hyper-V®, Virtual Box, or any other similar systems. Virtual desktop images can be persistent (static) or non-persistent (dynamic). A virtual desktop image may be produced by the remote server with only input-output data transferred to/from the client device. A VDI may utilize a hypervisor or a virtual machine monitor (VMM) interacting with the remote server's hardware (CPUs, memory, various other devices) directly or via the host operating system. The hypervisor or VMM may manage virtual guest operating systems accessible by the remote clients. Remote clients can then run applications on those guest operating systems as if they were local to the client.

In another illustrative example, client-server environment may be facilitated via Remote Desktop Services (RDS), Terminal Services, or similar resources. RDS may allocate on the remote server a separate guest operating system to each user connected to the server. The remote server may provide support for the client-server environment by a remote application server, such as Parallels® Remote Application Server (RAS). RAS facilitates connections of client devices with various applications that are running on the remote server. The remote application server may additionally provide client authentication, load balancing, and/or other features related to brokering the client connections to the virtual execution environments.

In certain implementations, the remote application server may further provide a client gateway in order to allow accessing remote applications running in virtual execution environments by HTML5-enabled browsers. The gateway serves, to a client device, a JavaScript code for parsing the data received from a virtual execution environment and displaying the data by the client browser.

In another implementation, a virtual execution environment may utilize a containerization engine, such as Docker engine for Linux, Turbo engine for Microsoft Windows, LXD engine for Ubuntu, Rocker engine for Core OS, or similar platforms. A containerization engine typically interacts with the remote host's operating system and allocates host's resources to each application remotely run on the host server. The containerization engine then isolates resources utilized by each application and makes each application run within its separate virtual container.

Because various virtual execution environments utilize hardware and software resources of the remote server host, a situation may arise where the remote server is overloaded by multiple applications executed simultaneously by various users via respective client devices. Alternatively, the server might not be overloaded, but the number of the network users may be so high that the experience of the user running an application on the server would be inadequate. Network quality issues, such as excessive channel noise, may also contribute to the same outcome—a threshold may be achieved where a remote user could be better off if the desired application were executed on the local device as opposed to the remote server host.

In some implementations, the remote application server may determine a remote efficiency value of executing an application on the remote host, by taking into account the load on the server, the quality of the network, user's preferences, etc. and compare it with a local efficiency value of executing the application on the client device. If the local efficiency value exceeds the remote efficiency value, the remote application server may provide a container image containing the image of the application to the client device and perform a series of operations to execute the application thereon, e.g. receiving the container image, unpacking it, and launching the application. If the local efficiency value is less than the remote efficiency value, the application may be launched on the remote host.

Accordingly, aspects of the present disclosure provide for taking advantage of the maximum efficiency achievable in the client-server environment and executing the application under the most favorable conditions for the current state of that environment, improving its overall performance. As a result, the system may benefit from the more efficient—compared with the situation when applications are always executed on the remote server—utilization of the resources of the client-server environment. A user may experience improvement in speed and increased quality of application execution. Likewise, other users of the same remote host server may take advantage of more server resources becoming available to them when some of the applications are executed by local user machines.

FIG. 1 illustrates schematically an exemplary high-level component diagram of a network architecture in which the methods and systems described herein may be implemented. Computer systems, appliances, network segments, and other software or hardware components are shown in FIG. 1 for illustrative purposes only, and the scope of the present disclosure is not limited to the architecture shown in FIG. 1. Routers, firewalls, load balancers, network switches, and/or various other software or hardware components may be omitted from FIG. 1 for clarity. Various other computer systems, software or hardware components, and/or methods of their interconnection—which are not shown in FIG. 1—may be compatible with the methods and systems described herein. The systems and methods described herein may be implemented by hardware (e.g., general purpose and/or specialized processing devices, and/or other devices and associated circuitry), software (e.g., instructions executable by a processing device), or a combination thereof. Various aspects of the above referenced disclosure are described in details below by way of examples, rather than by way of limitation.

As schematically illustrated by FIG. 1, the client-host computing system 100 may comprise one or more client devices 110, which may communicate over a network 140 with one or more remote hosts 150. The network 140 can be Internet, LAN, or a telecommunications network. The network can have access to a cloud storage 142. A cloud storage may be located off-premises, and use third-party cloud storage services, or similar platforms. Alternatively, cloud storage 142 can be located on-premises. Cloud storage can be a part of one of the remote hosts 150 or one of the client devices 110. In the description below, the singular terms, such as "client device," "host," "server," "environment," etc. will be understood to also correspond to plural terms, whenever more than one device or component can possibly be used. The remote host 150 may include one or more central processing units (CPU)—not explicitly shown on FIG. 1—also referred to as "processing devices," communicatively coupled to one or more memory devices and one or more peripheral devices via buses (not shown). "Processing device" refers to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module. "Processing device" herein refers to a device capable of executing instructions encoding arithmetic, logical, or I/O operations. In one illustrative example, a processing device may follow Von Neumann architectural model and may include an arithmetic logic unit (ALU), a control unit, and a plurality of registers. "Memory device" herein refers to a volatile or non-volatile memory, such as random-access memory (RAM), read-only memory (ROM), electrically erasable programmable read-only memory (EEPROM), or any other device capable of storing data. Examples of peripheral devices include storage devices (such as flash memory cards, flash memory sticks, compact disks, hard disk drives (HDDs) or solid state drives (SSDs)), input/output (I/O) devices (such as network interface controllers (NICs)) and various other devices, such as flash memory cards, compact disks, HDDs, or SSDs.

The remote host 150 may implement a virtual execution environment 160, for example but not limited to, one of the aforementioned virtualized execution environments, such as Remote Desktop Services, virtual desktop infrastructures, containerization engines, or virtual execution environments provided by HTML5-enabled browsers. The virtual execution environment may include a remote application server 170. The remote application server 170 (RAS) may be connected to the network 140 via a secure RAS gateway 162. The remote application server 170 may be communicating to an optional client authenticator service (not shown) which helps to establish the identity of a user of the client device 110 and negotiate a client-host connection via the network 140. Upon establishing and negotiating connection with the client device 110, the client authenticator service may determine the level of access the particular user/client device combination may have to the remote application server 170. By way of example, a user with the highest access level connecting from a work (e.g., desktop) computer may be allowed the maximum access to the remote application server 170 whereas the same user accessing the remote host 150 from a mobile device may be allowed a limited access to the remote application server 170.

Once the client authenticator determines the access level, the remote application server 170 may provide the list of available to the client device resources via publishing server 174 and transmit this list to the client device 110 via the network 140. A RAS client 120 may be located on the client device 110. The RAS client 120 may receive the list of published applications from the remote host and offer it to the user of the client device 110. The list may have graphical representations, such as windows, pop-ups, icons, etc. A console of the remote application server 170 may be used to display a list of published applications on RAS client 120. The RAS client 120 may then allow the user of the client device 110 to launch one or more applications on the remote host as if the application were executed on the client device 110. The RAS client 120 may transmit the list of client-selected applications to be executed in the virtual execution environment to the remote application server 170 of the remote host 150 over the network 140 and through the RAS gateway 162. The term "client-selected" should be understood in the broadest sense as including those applications that a human operator chooses to launch as well as applications that are executed automatically by the client device 110, such as applications auto-run during boot, or in response to actions taken by the user (such as starting a mail client or another application), or triggered by extrinsic evens (such as starting a teleconferencing application at a pre-arranged instance of time).

In some embodiments, RAS client 120 may be an HTML5-enabled browser. In such embodiments, the client-host system 100 may be configured to display published remote applications in one or more HTML pages which may be accessed by HTML5-enabled browsers running on the client devices. Thus, from the users' perspective, the published remote applications will be perceived as web-based applications, while in reality they are executed by the virtualized execution environment 160. A menu associated with each entry of the list may include a plurality of actions accessible to the user with respect to the published application, such as the client gateway identifier, the published application identifier, and the height and width of the frame to be displayed by the client device for rendering the application output. A JavaScript code may be utilized for parsing the data received from a virtual execution environment 160 and displaying the data by the client browser.

Responsive to receiving the list of client-selected applications by the remote application server 170, the virtual execution environment 160 may launch the application (henceforth, the singular word "application" should be understood to mean the entire plurality of applications selected by the user, if applicable) on the remote host 150 using one or more of the host's processing units and/or memory devices. The virtual execution environment 160 may further allocate host's physical (CPU, memory, etc.) and software (OS) resources to the launched application so to execute it inside a virtual application container using container image 180 separately from other applications run concurrently on the host server 150. Such concurrent applications may include other applications run from the same client device 110, applications run from other remote client devices, or other applications executed locally on the host 150.

The remote application server 170 may contain within itself, or be coupled to, a performance analyzer 176. The performance analyzer may be a software component coupled to the network 140 and to the remote host 150 directly or via the virtual execution environment 160. The performance analyzer 176 may collect data regarding the bandwidth, noise, and the quality of the network 140, the number and nature of applications already running on one or more virtual execution environments 160 of the host 150. The performance analyzer 176 may also collect data about the hardware and software capabilities of the client device 110 and further assess the number and nature of the applications running on the client device. The performance analyzer 176 may then calculate a remote efficiency value that indicates an estimated efficiency of running a client-selected application using the remote application server 170 of the remote host and compare this remote efficiency value with a local efficiency value that indicates an estimated efficiency of executing the same application directly on the client device 110. The remote efficiency value may be calculated using a variety of performance markers such as the speed of the application execution inside the virtual environment 160, the speed of data transfer between the client device 110 and the remote host 160 over the network 140, the speed of displaying textual and graphical information on the client device 110, the bandwidth of the network connection to the cloud storage 142, etc. The remote efficiency value may then be calculated by giving specific numerical weights to various performance markers, weights depending on a specific character of the client-selected application. For example, in calculating the remote efficiency value for a computing power-demanding mathematical calculation whose potential output is a table of numbers or a simple two-dimensional plot, a greater weight may be given to application execution speed and a lesser weight to the network bandwidth. In contrast, for a complex real-time graphical application requiring moderate computing power, a greater weight may be assigned to the network connection. Similarly, the local efficiency value may weigh a variety of local performance markers, such as local CPU 132 speed, memory 134 clock speed and burst rate, bus speed, performance of the local client operating system 130, performance of graphic and multimedia interfaces, etc.

Upon determining by the performance analyzer 176 that the remote efficiency value exceeds the local efficiency value for a given client-selected application, the remote application server 170 may decide to run the application on the remote host's virtual execution environment 160. Conversely, upon determining by the performance analyzer 176 that the local efficiency value exceeds the remote efficiency value, the remote application server 170 may decide to run the client-selected application locally on the client device 110 using client device's OS 130, central processing units 132, memory 134, and other devices 136, as applicable. In some embodiments, the remote application server 170 may make and execute a decision automatically, without any input from the user of a client device 110. In other embodiments, the remote application server 170 may present recommendations to the user of the client device 110 who subsequently makes a final decision. In yet other embodiments, the user is not expected to make a final decision. Instead, the RAS client 120 stores the user's preferences and makes a decision using those preferences. It is also possible that the user may nonetheless be informed about the decision and presented with an opportunity to veto it and instruct the RAS client 120 to execute a different decision. Alternatively, a system administrator of the remote host may be given a final say regarding where the application should be executed. A system administrator may be a human operator located anywhere—at the client device 110, remote host 150, or at any device connected to the network 140. In other embodiments, a role of the system administrator can be played by a script, a program, or another application run on any device connected to the network 140.

In some embodiments, the application may be executed on the remote server host whenever the remote efficiency value exceeds some threshold remote efficiency value regardless of the local efficiency value. Conversely, in other embodiments, the application may be executed on the client device whenever the local efficiency value exceeds some threshold local efficiency value regardless of the remote efficiency value.

In some embodiments, the local and remote efficiency values are further weighted against the respective security of the client device 110 and the remote host 150. The security weights assigned to various applications may vary depending on the nature of the application. For example, the remote application server 150 may decide that the security of the client device 110 is insufficient to execute a sensitive financial application on the client device even despite a significant slowdown of the network connection. At the same time, the remote application server may recommend that a word processing application be executed on the client device. If such security weights are taken into account, a final decision can still be made with or without a human input, as described above.

In some embodiments, where N remote hosts 150 are connected to the network 140, the performance analyzer 176 of the remote application server 170 may analyze the performance markers of all or some of those N remote hosts and compare the remote efficiencies to the local efficiency for the execution of the application on the client device 110. The remote application server 170 may then determine the optimal device for execution of the application with the security concerns weighted and/or human input taken into account as explained earlier.

In some embodiments, M client devices may be connected to the network 140. The performance analyzer 176 may further determine efficiency values for running an application from one of the client devices 110-A on a different client device 110-B. (Various client devices 110 and their letter "A" and "B" enumerations are not shown explicitly in FIG. 1.) For example, there may be a situation where all the hosts 150 are overloaded with currently run applications, but the quality of the network connection 140 is good. If, additionally, the client device 110-B has better computing and memory facilities than the client device 110-A, it may be more efficient to execute an application selected by the user of the client device 110-A on the client device 110-B.

Once a decision is made and, if applicable, approved to run the application anywhere other than on the host server 160, the remote application server 170 may perform the series of operations outlined below. For the sake of simplicity, the operations are described for a single client device connected to a single remote host, but substantially the same operations can be performed for a system of N hosts connected to M client devices.

Responsive to determination to execute the application on the client device 110, the remote application server 170 may provide a container image 180 of the application to the client device 110 via the network 140. The container image 180 may be located on the remote host 150 as shown on FIG. 1. Alternatively, the container image 180 may be located on the cloud storage 142 of the network 140, as indicated schematically by the dashed square on FIG. 1. In yet other embodiments, the container image 180 may be located in a plurality of places. The client device may have a client-based containerization engine component 122 located therein to instantiate the application from container image 180 in the local environment. The containerization engine 122 may be a client component of the containerization engine 272 (see FIG. 2) operating on the remote host server 150.

Containerization client 272 can be a client component of the Turbo engine, Docker engine, or a different virtual execution environment. Containerization engine 122 may be pre-installed on the client device 110 by a user or a system administrator. In some embodiments, a containerization engine 122 may be the client device's support for a Java virtual machine. In other embodiments, a containerization engine 122 may be a safe user space sandbox for secure execution of one or more executable files associated with the application container 180.

When the container image 180 is provided by the remote application server 170, it may be received by a container receiver 126. The container receiver 126 may include malware protection or other security applications. For example, container receiver 126 may analyze the content of the container image 180 and decide or make recommendations to the client device's user or system administrator whether to instantiate an application container based on the received container image 180 on the client device or not. The application container can be instantiated from the received application container image 180 by a container launcher 124 using the kernel of the local operating system 130. The launcher 124 may be a Java enabled HTML5 web browser or other part of the containerization engine 122. In other embodiments, the launcher 124 may be external to the containerization engine 122. For example, if an application is of the type already installed on the client device 110, the application launcher 124 may refer to the regular local script or procedure used to launch this type of application on the client device. In some embodiments, the application launcher 124 may ask the user or the administrator of the client device to launch the application.

In some embodiments, container image 180 created on the host server 150 can contain application code, runtime, settings, stored data from previous executions, tools, libraries, including system tools and libraries necessary to instantiate the application within a lightweight isolated container on the client device 110. The container image 180 may then be provided to the client device 110 and the container may be instantiated therein using the containerization engine 122. In other embodiments, a container image 180 created on the host server 150 may lack some or all of the aforementioned content of the container image 180; instead, the container image may include one or more references, such as a link or another indication of location where the remaining components of the application are to be found. The containerization engine 122 may then download those remaining components using the link(s) provided in the container image 180. The container can subsequently be instantiated on the client device 110 with the application run securely inside it. In yet other embodiments, the container image 180 may first be created and the container instantiated on the host server 150 using that container image. During the container execution, the remote application server 170 may decide to move the container to the client device 110. The container can then be transferred to the client device 110 using one of the methods of live migration, by transferring the container image 180 and the container snapshot—data reflecting the current state of the container, including the state of the application running therein, as stored on one or more remote host's memory devices 294 (see FIG. 2) and/or cloud storage 142, or parts thereof as assigned to the container.

In some embodiments, only data stored from previous executions, as well as settings, and system tools and libraries necessary to instantiate the container may be placed inside the container image 180, whereas the application itself may be downloaded from a provider server or another resource available through network 140. The application container launcher 124 (or a different component) may then install the application on the local client OS 130, instantiate the container from the container image 180 and execute the application inside that container. In other embodiments, system tools and libraries necessary to instantiate the container may already be located on the client device 110 in a way accessible to the client-based containerization engine component 122.

In some embodiments, where the container has been instantiated on the client device 110 during one or more previous executions of the application thereon, a container image may already exist on the client device 110 and may have at least some of the application code, settings, data, tools, or libraries. The remote application server 170 may then update the container image (not shown in FIG. 1) stored on the client device with up-to-date components of the remote host's container image 180 and instantiate the container on the client device 110 as described above. In other embodiments, the pre-existing container image on the client device may be used to facilitate live migration of a running container from the remote host 150. For example, the container image 180 may first be created and the container instantiated on the host server 150 using that image prior to a decision to move the container to the client device. Responsive to such decision, the remote application server 170 can make a live snapshot of the container running on the server and update the container image stored on the client device 110 with the latest data from the live snapshot. The container image may then be used to instantiate the container on the client device 110 with the application run securely inside the container, as explained above. Alternatively, the container can be instantiated on the client device first, using the pre-existing container image, and only afterwards updated from the live snapshot of the running container running on the remote host 150. In other embodiments, instantiation of the container on the client device and updating it from a live snapshot may be executed concurrently, or in multiple stages staggered in time.

The container launcher 124 may further be able to access licensing information and verify that the number of applications run by the organization has not exceeded the allowed number and/or ensure that the application is allowed to be executed on the client device 110. Alternatively, the launcher 124 may communicate with the remote application server 170 to retrieve licensing information. Alternatively, the licensing information can be verified by the remote application server 170 prior to providing the container image 180 to the client device 110.

When the remote application server 170 first receives the request to execute an application, it may retrieve user-client data associated with the application, for example data generated and stored during previous executions of this application, and stored in one or more memory devices 294 (see FIG. 2) of the host 150, and provided together with the container 180 to the client device. In some embodiments, the application data may be stored on the cloud storage 142 or in the memory 134 of the client device. In such instances, the container image 180 may contain addresses and instructions how to access the application data. In some embodiments, the application data may be stored in more than one or more physical or virtual locations and retrieved when the container image 180 is created on the host machine 150 and/or after it is received by the client device. By way of example, the RAS client 120, the containerization engine 122, or a separate application may associate user's profile, preferences, schedule for expected task completion, etc. with the application container. The same process, as described previously, of the retrieval and/or addition of data may be implemented if the application is executed on the remote host 150 rather than on the client device 110.

At the completion of the application session, the application data generated during the session may be added to the cloud storage 142, or client memory 134, or remote host memory 294, or to any combination thereof as desired or configured by the user or the system administrator. In a situation where the local application on the client device existed prior to the initiation of the remote client-host session, the local application may be synchronized with the latest remote session version. This may be done automatically, or based on user input.

When the container image 180 is provided by the remote host 150 to the client device 110, it may be advantageous to save computing and memory resources and delete the container image from the host, for example to make host resources available to other remote or local users. Upon completion of the application session, the remote host 150 may update the existing or create a new container image by retrieving the application data from the client device 110 via the network 140.

In those embodiments where launching the application on the client device requires downloading and installing the application, the client device 110 may delete the application installation after the closure of the application session. This may be performed automatically by the containerization engine 122. Alternatively, the client device may offer a user or a system administrator an option to keep or delete the local installation on the client device.

With respect to all embodiments, the aforementioned steps, where at all applicable, may be performed automatically with no input from the user. Alternatively, during the execution of any one or more of the aforementioned steps an approval from the user or the system administrator may be sought before the implementation of any particular step.

Figure 2:
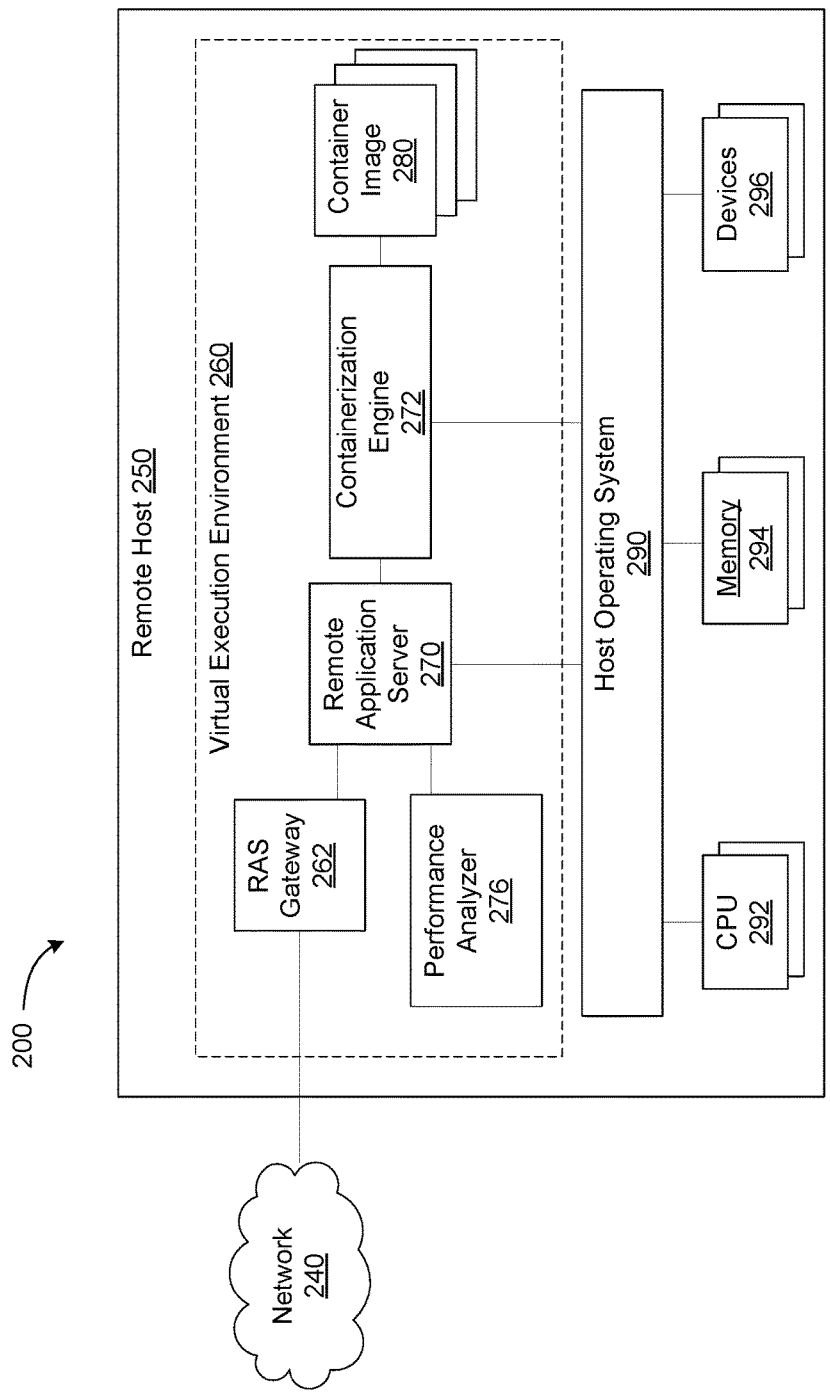
FIG. 2 shows one example of a virtual execution environment with the containerization engine installed on the operating system of the remote host.

FIG. 2 illustrates one possible implementation 200 of a virtual execution environment 260 on the remote host 250 where a containerization engine 272, such as Turbo, Docker, chroot, lmctfy, LXC, OpenVZ, Virtuozzo, Solaris Containers, FreeBSD, sysjail, WPARs, SAndboxie, iCore Virtual Accounts, or any other engine capable of facilitating the OS-level virtualization. The containerization engine 272 may allow the kernel of the operating system 290 to create multiple isolated container images 280. A remote application server 270 may allow remote client devices to access applications available on the remote host 250 through the network 240 and RAS gateway 262. To remote clients application containers may look like real applications run on client devices. A user of a remote client device may only be able to see the container's contents and devices assigned to that container. A performance analyzer 276 (analogous to the performance analyzer 176 of FIG. 1) of the remote application server 270 may be located on the remote host 250.

The advantages of the container virtualization of FIG. 2 is that the host OS 290 may allocate each application container limited remote host's resources, such as CPU 292 time, memory 294 space, and/or other devices 296 capabilities. FIG. 2, therefore, represents one possible implementation of the transferrable containerized applications in client-server computing. Other implementations of transferrable containerized applications can also be envisioned.

Figure 3:
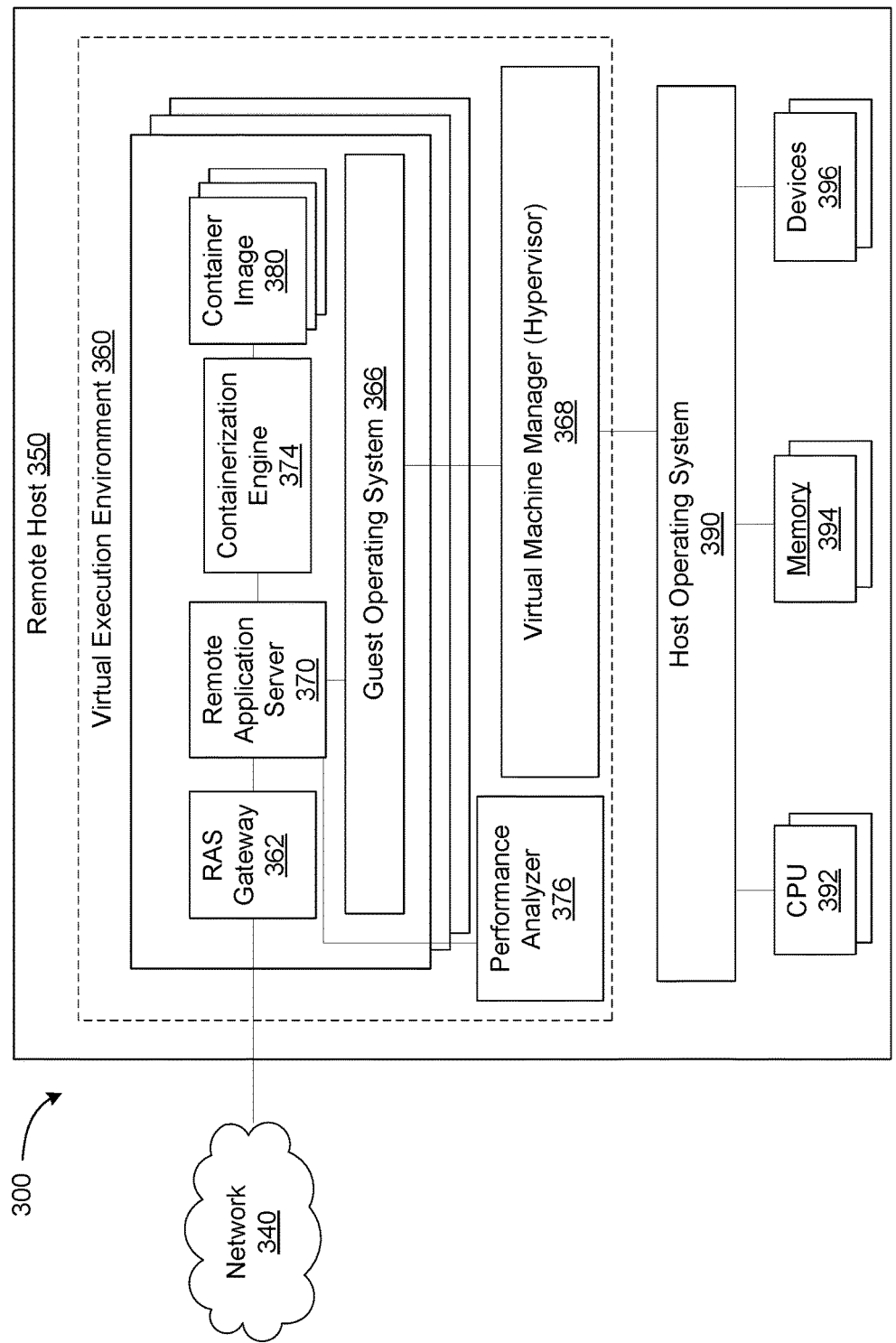
FIG. 3 shows another example of a virtual machine execution environment where multiple guest operating systems are managed by a virtual machine monitor installed on the host operating system.

FIG. 3 illustrates by way of example another such possible realization 300—virtual machine environment—where the host operating system 390 of the remote host 350 supports multiple virtual machines for multiple clients accessing the host via network 340. A virtual machine monitor 368 (also often referred to as a hypervisor) installed on the host machine interacts with the kernel of the host OS 390 and facilitates the creation of virtual machines, each with a separate guest operating system 366 supporting application execution on those machines. Each client accessing the remote host may be provided with a separate virtual machine with a dedicated OS system 366. A remote application server 370 may further be installed and launched on the guest OS 366. When a client device accesses remote application server via RAS gateway 362, RAS 370 may publish applications available on the guest OS 366, in a manner similar to the manner explained above in relation to FIG. 1, and transmit the list of applications to the client device 110 via network 340. The remote application server 370 may have access to a containerization engine 374 which may execute the application selected by the user of the remote device separately from other concurrent applications run on the guest OS 366 by the same user. This may be accomplished by creating container images 380 using the application, its dependencies, and associated data. The virtual machines execution environment 360 may be interacting with the host OS 390 via the hypervisor 368 that may allocate host's physical (CPU, memory, etc.) and software (OS) resources to the application run in separate containers in order to isolate containers 380 from each other. A performance analyzer 376 (analogous to the performance analyzer 176 of FIG. 1) of the remote application server 270 may be located on the remote host 250.

When RAS 370 receives a client request to launch an application, RAS may refer the request to the performance analyzer 376. The performance analyzer 376 may collect data about the quality of the network 140 and the number and nature of applications already running on the host server, including the client's virtual machine 360 as well as other virtual machines 360 running concurrently on the host server. The performance analyzer 376 may also collect data about the hardware and software capabilities of the client device 110 and further assess the number and nature of the applications running on the client device. The performance analyzer 376 may then determine the remote efficiency value of running the client-selected application using the remote host and compare the remote efficiency with the local efficiency of executing the same application directly on the client device. Depending on the relation between the two efficiency values, the remote application server 370 may determine to run the application on the remote host or locally on the client device in a manner similar to the one described above in relation to FIG. 1. In some embodiments, a user of the client device 110 may make a final decision about where to run the application.

Figure 4:
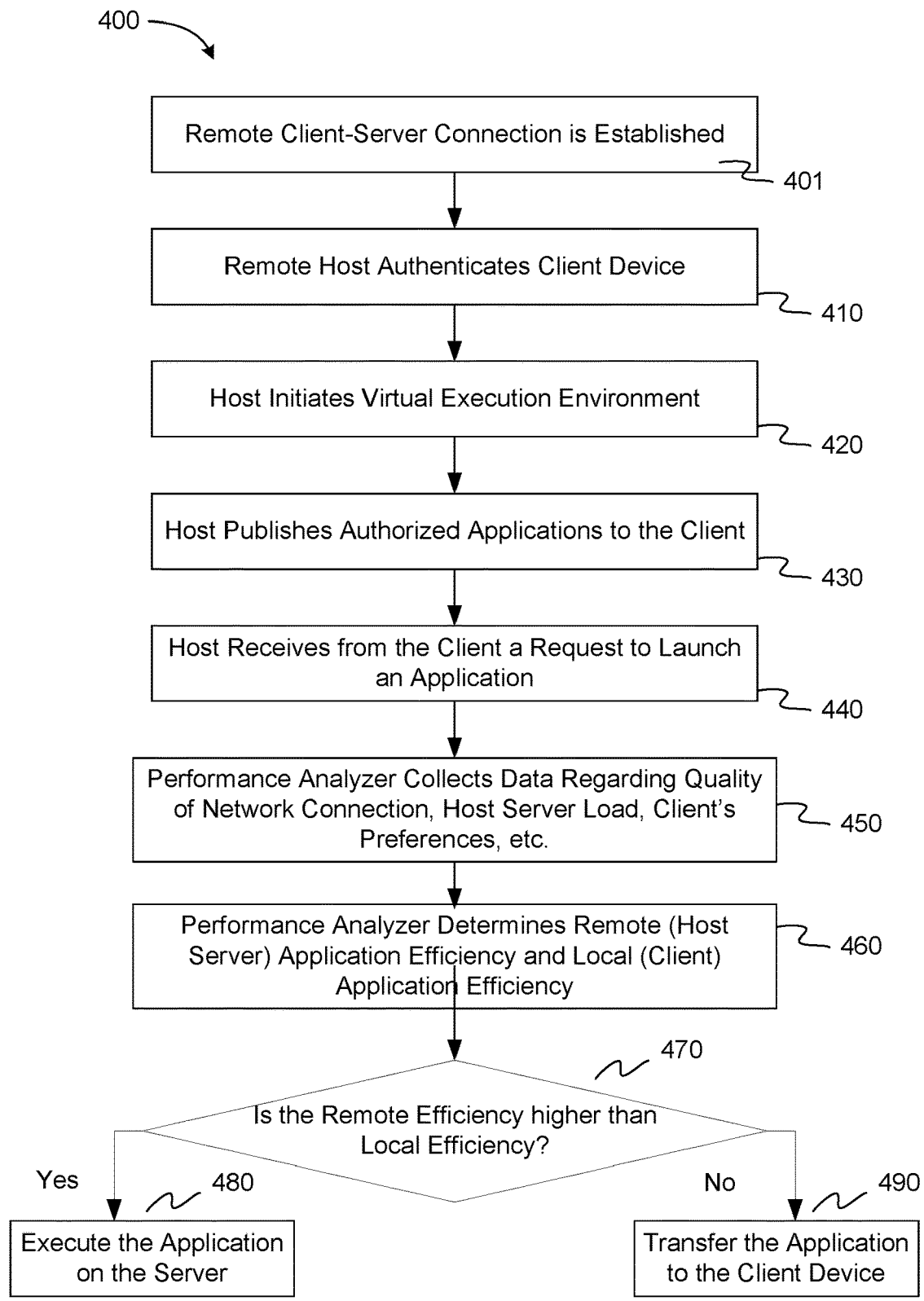
FIG. 4 depicts a block diagram of one of the possible implementations of the method of launching an application in a client-server computing environment.

FIG. 4 depicts a flow diagram of one illustrative example of method 400 of using transferrable application containers within client-server computing environment. Method 400 and/or each of its individual functions, routines, subroutines, or operations may be performed by one or more processing units of the remote host implementing the method, e.g. 292 of FIG. 1 (showing implementation of a containerization-type virtual execution environment) or 392 of FIG. 3 (showing a virtual machines execution environment). In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 401, the remote host may establish a connection between a client device and a remote host server. This client-server connection may be provided via a local area network or a public network such as the Internet, or with the help of a telecommunications network. Alternatively, the client-server connection may be initiated by a user of the client device. In yet other embodiments, the connection may be permanently established.

At block 410, the remote host 150 may authenticate the client device 110. Authentication may be implemented by various mechanisms. By way of example, the remote host 150 may send a request to the client device for login ID and password information that should be provided by a user of the client device and transmitted to the remote host server 150. In other embodiments, the remote host 150 may perform a more complex multi-factor authentication. In some embodiments, authentication may be initiated by the client device. In yet other embodiments, no authentication may be needed.

At block 420, remote host 150 establishes and allows access of the client device 110 to a virtual execution environment 160. A client-server virtual execution environment can have a variety of possible implementations. A virtual execution environment may be a remote personal computer agent running on a personal computer system, a virtual desktop infrastructure, Remote Desktop Services, Terminal Services, HTML5-enabled virtual execution environment, or a virtual execution environment utilizing a containerization engine.

At block 430, the remote host's RAS 170 generates and transmits to the client device 110 the list of applications available to the client device within the specific virtual execution environment 160 established on the remote server host 150. Alternatively, the list of available applications may be stored on the client device 110 or on the cloud storage 142 of the network 140.

At block 440, remote application server 170 may receive a request to launch an application transmitted by the RAS client 120. The request may be initiated by the user or the system administrator. In some embodiments, the request may be submitted by a third entity. In some embodiments, the request is sent automatically upon detecting that a virtual execution environment has been established or a list of applications has been published.

At block 450, the remote application server 170, e.g., through its performance analyzer component 176, may collect data about the current quality of the network 140 connection, such as its bandwidth and noise, the number and nature of applications already running on one or more virtual execution environments of the host server, as well as data about the hardware and software capabilities of the client device 110. Some of the aforementioned data may be pre-stored on the remote application server 170. Performance analyzer can further retrieve preferences of the user stored on RAS 170 or on the RAS client 120 of the client device 110.

At block 460, the performance analyzer 176 may determine the remote efficiency value for executing the application on the remote host 150 and the local efficiency value for executing the application on the client device 110. The remote efficiency value may take into account a variety of performance markers, including but not limited to the speed of the application execution inside the virtual environment of the remote host server, the speed of data transfer between the client device and the remote host over the network, the speed of displaying relevant application information (graphic or textual) on the client device, the bandwidth of the network connection to the cloud storage, etc. The performance analyzer 176 may assign numerical weights to various performance markers, depending on a specific nature of the client-selected application, as described above. In some embodiments, the local and remote efficiency values are further weighted taking into account the security of the client device 110 and the remote host 150.

At step 470, responsive to comparing the obtained remote efficiency value and local efficiency value, the remote application server 170 may determine whether to run the client-selected application on the host server or on the local client device. For example, if the remote efficiency value exceeds the local efficiency value, the remote application server may determine to run the application on the remote host's virtual execution environment. Conversely, upon determining that the local efficiency exceeds the remote efficiency, RAS 170 may determine to run the client-selected application on the client device 110. In some embodiments the decision by RAS may be final. In other embodiments, RAS may only make a recommendation to the user or the administrator of the client device who may then make a final decision. In yet other embodiments, a system administrator of the remote host may be given a veto authority regarding where the application should be executed.

Responsive to a final decision to execute the application on the remote host, the remote application server may proceed with launching the application on the server at step 480. Alternatively, if the decision is made to execute the application on the client device 110, the remote application server 170 may perform a series of operations at block 490 to provide the application to the client device 110 and launch the application thereon.

Figure 5:
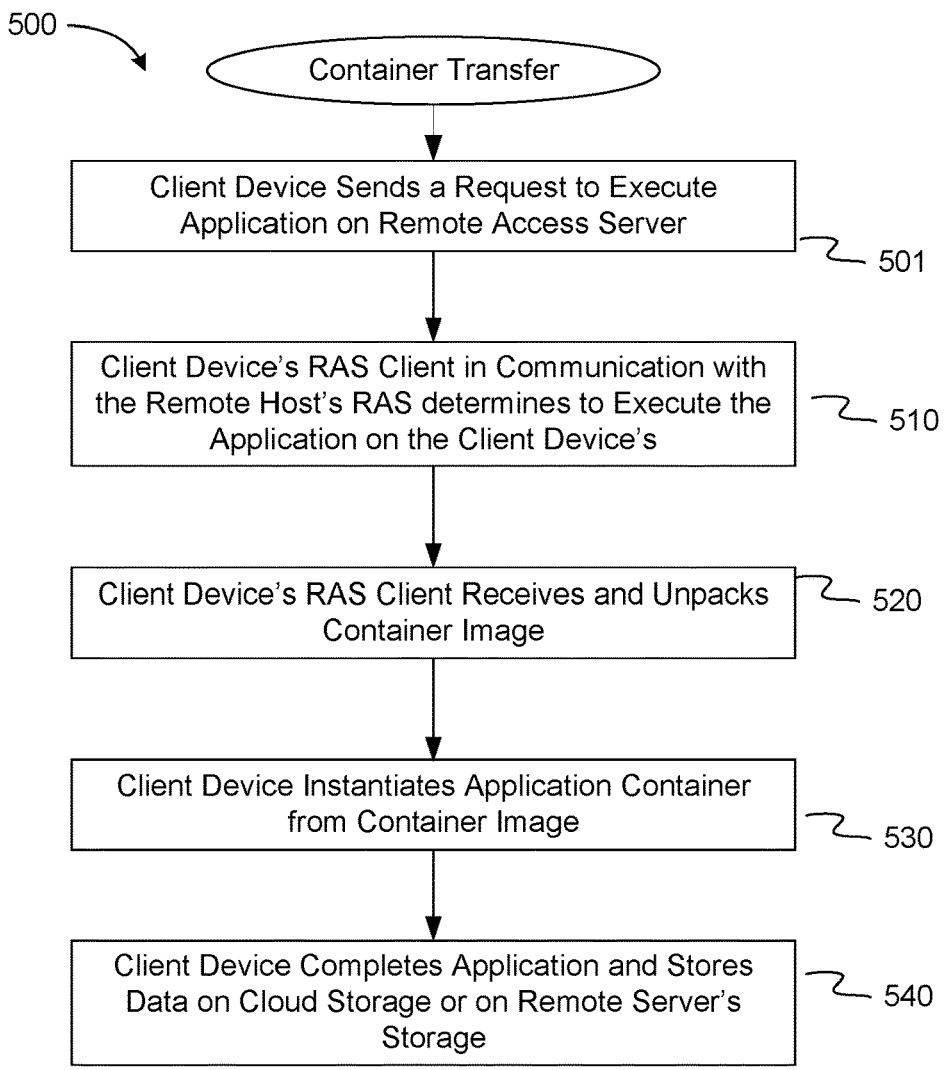
FIG. 5 depicts a block diagram illustrating one possible implementation of how containerized application transfer may be implemented in a client-server computing environment.

FIG. 5 illustrates, by way of example, one possible implementation 500 of a method of execution of a client-selected application on the local client device. At block 501, the client device sends to the remote application server 170 a request to execute an application on the remote server 150. At block 510, the RAS client 120 on the client device 110 in communication with RAS 170 on the remote server 150 may determine that the remote efficiency value of executing the application on the host server 150 is below the local efficiency value of launching the application on the local client device 110. For example, RAS client 120 may obtain information about the load on the remote server 150, bandwidth and noise of the network 140, preferences of the user of the client device, security settings, etc. RAS client 120 may then determine the remote efficiency value and the local efficiency value.

Responsive to making such determination, at block 520, the RAS client 120 may retrieve the application container image 180 from the virtual execution environment 160 of the remote host 150 via the network 140. Alternatively, the container image may be located in a cloud storage 142 accessible via the network 140. In some embodiments, the container image may be stored in one or more of a plurality of locations such as the remote host, the cloud storage, and the client device. The RAS client may retrieve the container image 180 from a plurality of such locations. A containerization engine 122 located on the client device 110 may receive and unpack the container image 180 with the client-selected application. In those instances where the application is already installed on the client device, the container image may contain only data associated with the application. In other instances, the container image may also contain executable files, such as the archived installation of the application. Upon receiving such container image, the containerization engine 122 may install the application on the client device 110 before executing the application At block 530, the application container may be instantiated from the container image 180 on the client device by the container launcher 124 using the kernel of the local operating system 130, processing units 132, memory 134, and other devices 136, including peripheral ones, of the client device 110. When the application session is closed, the installed application may be uninstalled, if desired, and/or temporary files associated with the application may be removed from the client device 110. Alternatively, the application installation may be kept on the client device for future uses.

At block 540, as the application session is finished or still running, the data generated by the application may be uploaded to and stored on the cloud storage 142 or the remote host's computer-readable storage media. In some embodiments, data may also be stored on the client device 110. In some embodiments, data may be synchronized among various storages, such as the local device storage 110, the cloud storage 142, and/or remote host 150's storage.

Figure 6:
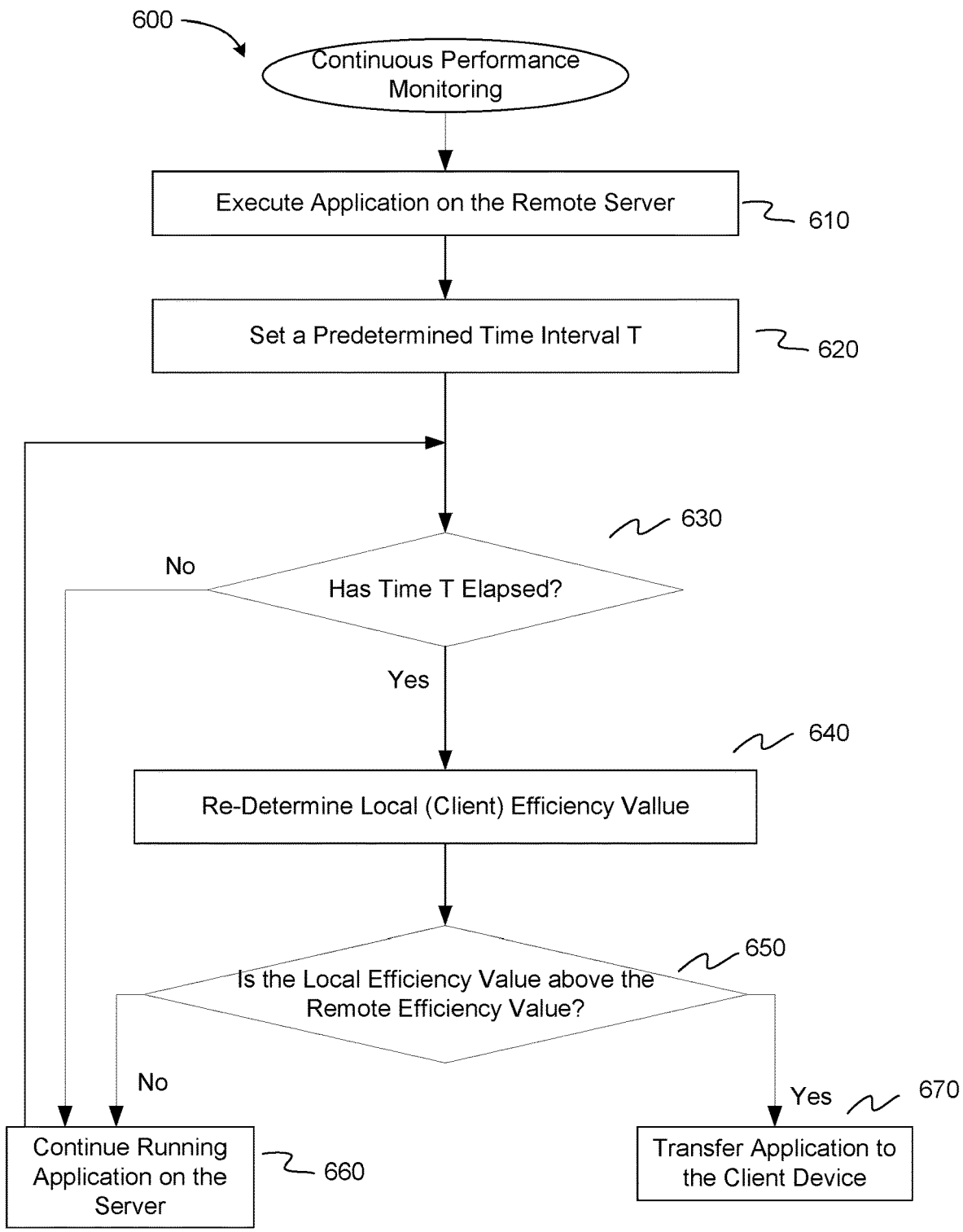
FIG. 6 depicts a block diagram illustrating one possible implementation of a continuous performance monitoring while an application is being executed in a client-server computing environment.

FIG. 6 depicts a possible embodiment 600 where the remote application server 170 conducts periodic performance checks of the efficiencies of application execution. In this embodiment it is recognized that the remote and local efficiency values are not necessarily static and can vary as the parameters of the client-server computing system 100, such as the network quality and server load, change during the execution of the application. Accordingly, one may set up periodic reassessment of the remote and local efficiency values. By way of example, at block 610 a decision to execute an application on the remote host server is made according to one of the possibilities discussed heretofore and the application is so executed. At block 620, a predetermined time interval T may be set by the remote application server 170. In some embodiments, the time interval T may be set by RAS client 120, or by a user of the client device 110.

At block 630, it may be verified whether time T has elapsed since the start of the application or since the last check. If so, at step 640, the remote application server 170 may re-evaluate the remote efficiency of keeping the application running on the remote server host 150 and the local efficiency of executing the application on the local client device 110. If the comparison at step 650 shows that the remote efficiency still exceeds the local efficiency, the remote application 170 server may decide to continue executing the application on the remote server, as shown in 670. However, if it is determined that the new local efficiency is now greater than the remote efficiency—for example the quality of the network has deteriorated or the server load increased since the last check—the remote application server 170 may determine to transfer the application to the local client device 110 as described above, as indicated by block 680. The metrics for periodic re-evaluation and comparison of the remote efficiency value and the local efficiency value may differ from the initial determination of these values performed prior to starting the application. In particular, the re-evaluation metrics may include the temporal loss of productivity associated with transferring the container to the local device, such as the time and resources required to terminate the execution of the application on the remote server and/or repackage application data into the application container.

In some embodiments, transfer of the application container from the remote host 150 to the client device 110 may be performed using live migration. In particular, the remote application server 170 may freeze the application container on the remote host by blocking memory, processes, file system, application data, etc. The remote application server may then provide the resulting container image to the client device 110 and instantiate the application container therein from the provided container image. In some embodiments, the freezing and transfer of the container may be performed in multiple stages, using pre-copy memory, post-copy memory, or lazy migration methods.

Periodic monitoring may be set up with repetition time T that can be made as long or as short as desired. Time T may depend on a particular nature of the application, user's preferences, or it may be a function of the volatility of the network connection and/or server's load. In some embodiments, the time interval T may be made sufficiently small so that an essentially quasi-continuous monitoring is implemented.

A method of periodic monitoring of the efficiencies may be similarly used when the initial decision was to execute the application on the client device rather than on the remote server. RAS 170 and/or RAS client 120 may similarly re-evaluate the remote and local efficiencies after every time interval T and re-determine if transferring the application to the remote host server is desirable. For example, if the quality of the network has improved since the last re-evaluation or the peak activity on the server has subsided, the container with the application may be transferred back to the host server. The remote application server may decide to keep the installed copy of the application on the client device until at least the completion of the ongoing application session, in order to speed up transferring the application container to the client device back, if the conditions of the client-host environment change again.

Figure 7:
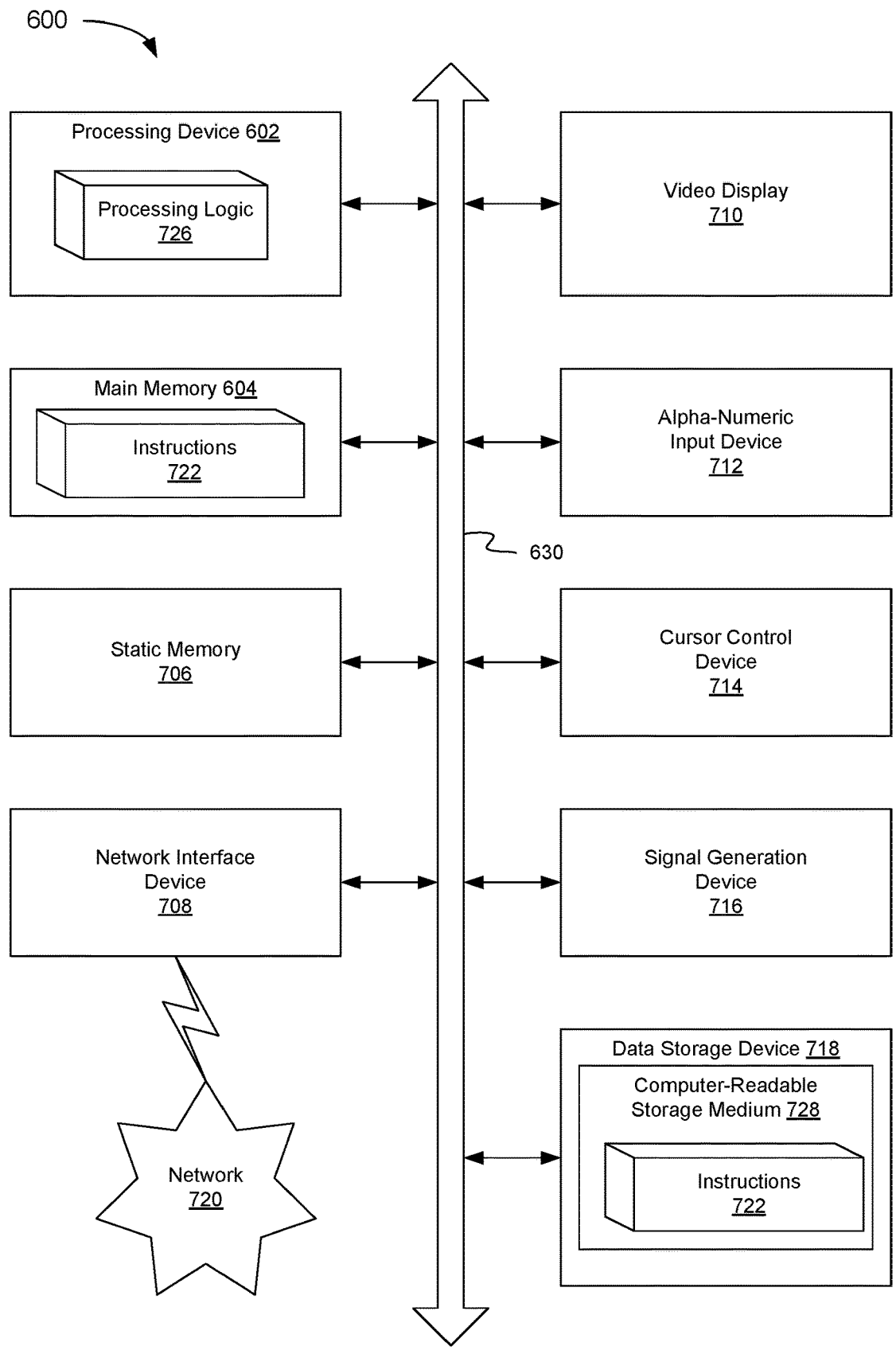
FIG. 7 depicts a block diagram of an example computer system operating in accordance with one or more aspects of the present disclosure.

FIG. 7 schematically illustrates a component diagram of an example computer system 700 which may perform any one or more of the methods described herein. In various illustrative examples, computer system 700 may represent the remote host 150 and/or client device 110 of FIG. 1.

Example computer system 700 may be connected to other computer systems in a LAN, an intranet, an extranet, and/or the Internet. Computer system 700 may operate in the capacity of a server in a client-server network environment. Computer system 700 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 700 may comprise a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which may communicate with each other via a bus 730.

Processing device 702 represents one or more general-purpose processing devices such as a microprocessor, central processing unit, or the like. More particularly, processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 may be configured to execute instructions implementing method 400 of initiating application execution in a client-server virtual execution environment, and/or method 500 of delivering application containers to the client device, and/or method 600 of periodic monitoring of remote server's performance.

Example computer system 700 may further comprise a network interface device 708, which may be communicatively coupled to a network 720. Example computer system 700 may further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 may include a computer-readable storage medium (or more specifically a non-transitory computer-readable storage medium) 728 on which is stored one or more sets of executable instructions 722. In accordance with one or more aspects of the present disclosure, executable instructions 722 may comprise executable instructions implement method 400 of initiating application execution in a client-server virtual execution environment, and/or method 500 of delivering application containers to the client device, and/or method 600 of periodic monitoring of remote server's performance.

Executable instructions 722 may also reside, completely or at least partially, within main memory 704 and/or within processing device 702 during execution thereof by example computer system 700, main memory 704 and processing device 702 also constituting computer-readable storage media. Executable instructions 722 may further be transmitted or received over a network via network interface device 708.

While computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   receiving, by a remote computing device a request to execute an application;
   determining, by a processing device, a remote efficiency value and a local efficiency value, wherein the remote efficiency value is determined using a weighted first plurality of performance markers indicative of estimated efficiency of executing the application on the remote computing device, and wherein the local efficiency value is determined using a weighted second plurality of performance markers, wherein each of the second plurality of performance markers is indicative of estimated efficiency of executing the application on a local computing device; and
   comparing the remote efficiency value with the local efficiency value to determine whether to execute the application on the remote computing device or the local computing device.

2. The method of claim 1, further comprising, upon determining that the remote efficiency value exceeds the local efficiency value, starting execution of the application on the remote computing device.

3. The method of claim 1, further comprising, upon determining that the remote efficiency value does not exceed the local efficiency value, causing the application to be executed on the local computing device.

4. The method of claim 3, wherein causing the application to be executed on the local computing device further comprises providing to the local computing device a container image comprising at least one of a data associated with the application, an executable file associated with the application, or an indication of a location where the data associated with the application is stored.

5. The method of claim 1, wherein determining the remote efficiency value further comprises determining at least one of a bandwidth of a network connection, a quality of the network connection, a number of other applications running on the remote computing device, or a type of other applications running on the remote computing device.

6. The method of claim 2, further comprising:
   re-determining the remote efficiency value at a time after starting execution of the application on the remote computing device; and
   responsive to determining that the local efficiency value exceeds the re-determined remote efficiency value, causing the application to be transferred to the local computing device.

7. The method of claim 6, wherein transferring the application to the local computing device further comprises receiving, by the local computing device, a container image comprising at least one of a data associated with the application, an executable file associated with the application, or an indication of a location where the data associated with the application is stored.

8. A non-transitory computer-readable medium having instructions stored thereon that, when executed by a processing device cause the processing device to:
   receive, by a remote computing device a request to execute an application;
   determine a remote efficiency value and a local efficiency value, wherein the remote efficiency value is determined using a weighted first plurality of performance markers indicative of estimated efficiency of executing the application on the remote computing device, and wherein the local efficiency value is determined using a weighted second plurality of performance markers indicative of estimated efficiency of executing the application on a local computing device; and
   compare the remote efficiency value with the local efficiency value to determine whether to execute the application on the remote computing device or the local computing device.

9. The computer-readable medium of claim 8, wherein the instructions are further to cause the processing device to determine that the remote efficiency value exceeds the local efficiency value and start execution of the application on the remote computing device.

10. The computer-readable medium of claim 8, wherein the instructions are further to cause the processing device to determine that the remote efficiency value does not exceed the local efficiency value and cause the application to be executed on the local computing device.

11. The computer-readable medium of claim 10, wherein the instructions are further to cause the processing device to provide, to the local computing device, a container image comprising at least one of a data associated with the application, an executable file associated with the application, or an indication of a location where the data associated with the application is stored.

12. The computer-readable medium of claim 8, wherein the instructions are further to cause the processing device to determine at least one of a bandwidth of a network connection, a quality of the network connection, a number of other applications running on the remote computing device, or a type of other applications running on the remote computing device.

13. The computer-readable medium of claim 9, wherein the instructions are further to cause the processing device to re-determine the remote efficiency value at a time after the application is started on the remote computing device, wherein the instructions are further to cause the processing device to determine that the local efficiency value exceeds the re-determined remote efficiency value, and wherein the instructions are further to cause the processing device to transfer the application to the local computing device.

14. The computer-readable medium of claim 13, wherein the instructions to cause the processing device to transfer the application to the local computing device are further to cause the processing device to create an application container comprising at least one of a data associated with the application, an executable file associated with the application, or an indication of a location where the data associated with the application is stored, and wherein the instructions are further to cause the processing device to provide the application container to the local computing device.

15. A system comprising:
   a memory that stores instructions; and
   a processing device to execute the instructions from the memory to:
      receive, by a remote computing device, a request to execute an application;

determine a remote efficiency value and a local efficiency value, wherein the remote efficiency value is determined using a weighted first plurality of performance markers indicative of estimated efficiency of executing the application on the remote computing device, and wherein the local efficiency value is determined using a weighted second plurality of performance markers indicative of estimated efficiency of executing the application on a local computing device; and compare the remote efficiency value with the local efficiency value to determine whether to execute the application on the remote computing device or the local computing device.

16. The system of claim 15, wherein the processing device is further to determine that the remote efficiency value exceeds the local efficiency value and to start execution of the application on the remote computing device.

17. The system of claim 15, wherein the processing device is further to determine that the remote efficiency value does not exceed the local efficiency value and execute the application on the local computing device.

18. The system of claim 15, wherein to start the application on the local computing device, the processing device is further to provide to the local computing device a container image comprising at least one of a data associated with the application, an executable file associated with the application, or an indication of a location where the data associated with the application is stored.

19. The system of claim 15, wherein the processing device is further to determine at least one of a bandwidth of a network connection, a quality of the network connection, a number of other applications running on the remote computing device, and a type of other applications running on the remote computing device.

20. The system of claim 16, wherein the processing device is further to
   re-determine the remote efficiency value at a time after starting execution of the application on the remote computing device;
   determine that the local efficiency value exceeds the re-determined remote efficiency value;
   create a container image for the application;
   place into the container image at least one of a data associated with the application, an executable file associated with the application, or an indication of a location where the data associated with the application is stored; and
   provide the container image to the local computing device for instantiation on the local computing device.

* * * * *